US012676169B2

(12) United States Patent
Zhang et al.

(10) Patent No.: US 12,676,169 B2
(45) Date of Patent: Jul. 7, 2026

(54) DEMODULATION CIRCUIT AND SERVER

(71) Applicant: SUZHOU METABRAIN INTELLIGENT TECHNOLOGY CO., LTD., Suzhou (CN)

(72) Inventors: Xinwei Zhang, Suzhou (CN); Jinfeng Li, Suzhou (CN); Zhengfeng Yuan, Suzhou (CN); Baobin Zhu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/488,701

(22) PCT Filed: Dec. 6, 2024

(86) PCT No.: PCT/CN2024/137565
§ 371 (c)(1),
(2) Date: Nov. 28, 2025

(87) PCT Pub. No.: WO2025/200573
PCT Pub. Date: Oct. 2, 2025

(65) Prior Publication Data
US 2026/0120725 A1 Apr. 30, 2026

(30) Foreign Application Priority Data
Mar. 29, 2024 (CN) .......................... 202410382119.3

(51) Int. Cl.
*G11B 20/10* (2006.01)
*G11B 5/00* (2006.01)
*G11B 27/36* (2006.01)

(52) U.S. Cl.
CPC .................................. *G11B 27/36* (2013.01)

(58) Field of Classification Search
CPC ........... G11B 5/00; G11B 33/12; G11B 13/40; G11B 33/02; G11B 33/128; G11B 33/027;
(Continued)

(56) References Cited

U.S. PATENT DOCUMENTS 8,793,532 B1 7/2014 Tsai et al.
11,656,943 B2 * 5/2023 Yang ..................... G06F 11/076
714/6.32
(Continued)

FOREIGN PATENT DOCUMENTS

CN 101427227 A 5/2009
CN 112540641 A 3/2021
(Continued)

OTHER PUBLICATIONS

The search report of PCT application No. PCT/CN2024/137565 issued on Mar. 10, 2025.
The search report of CN application No. 202410382119.3 issued on May 11, 2024.

*Primary Examiner* — Nabil Z Hindi
(74) *Attorney, Agent, or Firm* — Scully, Scott, Murphy & Presser, P.C.

(57) ABSTRACT

A demodulation circuit and a server are provided for solving the problem of an inaccurate pulse width measured by an oscilloscope. An analysis circuit analyzes a high-level signal and a low-level signal in a first signal to obtain a corresponding first pulse width and a corresponding second pulse width, and a sampling control circuit controls sampling timing to trigger a sampling circuit to sample the first pulse width and the second pulse width at a correct occasion, so as to realize analysis of hard disk data. Circuit modules in the analysis circuit in the present disclosure act together to realize accurate analysis of hard disk data. Due to a high (Continued)

response speed of a hardware circuit, the efficiency of analyzing the hard disk data may be improved.

20 Claims, 4 Drawing Sheets

(58) Field of Classification Search
CPC ........ G11B 2220/2516; G11B 20/1889; G11B 5/012; G11B 2020/10898; G11B 20/1217; G11B 5/59655; G11B 2020/1229; G11B 2020/1238; G11B 20/1009; G11B 27/3027; G11B 20/10268; G11B 27/36; G11B 20/10
USPC .................................. 360/23, 24, 25, 31, 29
See application file for complete search history.

(56) References Cited

U.S. PATENT DOCUMENTS

| | | |
|---|---|---|
| 2015/0149672 A1 | 5/2015 | Mishra et al. |
| 2020/0050575 A1 | 2/2020 | Mishra et al. |

FOREIGN PATENT DOCUMENTS

| | | |
|---|---|---|
| CN | 215773547 U | 2/2022 |
| CN | 114759907 A | 7/2022 |
| CN | 115705270 A | 2/2023 |
| CN | 117375591 A | 1/2024 |
| CN | 117971609 A | 5/2024 |

* cited by examiner

Output signal of filter circuit

R14

U16

First signal outputted by hard disk state pin

U1 at output end of second integration circuit

U2 at output end of third integration circuit

Control timing of K1

Control timing of K2

Timing outputted by sampling control circuit

DEMODULATION CIRCUIT AND SERVER

CROSS-REFERENCE TO RELATED APPLICATION APPLICATIONS

The present disclosure is a National Stage Entry under 35 U.S.C. § 371 of PCT International Application No. PCT/CN2024/137565, filed Dec. 6, 2024, which claims the priority of Chinese Patent Application No. 202410382119.3, filed with the Chinese Patent Office on Mar. 29, 2024 and entitled "Demodulation Circuit and Server", the entire contents of each of which are incorporated herein by reference for all purposes.

TECHNICAL FIELD

The present disclosure relates to the technical field of data processing, and in particular to a demodulation circuit and a server.

BACKGROUND

Hard disks are one of the most important storage devices in computers. Therefore, the healthy operation of the hard disks is one of the key factors in ensuring the reliability of device servers.

In order to ensure the accurate control of an operating state of the hard disk, the device needs to perform monitoring during the operation of the hard disk, so as to acquire state information of the hard disk. Current main hard disk monitoring solutions are classified into hard disk in-band monitoring and hard disk out-of-band monitoring. The hard disk in-band monitoring is to acquire the state information of the hard disk after data communication is performed between monitoring software operated on a Central Processing Unit (CPU) and the hard disk. It is usually difficult to show monitoring data to operations personnel by such monitoring solution. The out-of-band monitoring of the hard disk is to acquire hard disk state information by a Baseboard Management Controller (BMC) and then monitor the state of the hard disk. A pulse width is a form for carrying data during data transmission. Research of pulse width demodulation is required to realize data analysis. The primary manner currently used involves connecting a pin outputting state information of the hard disk to an oscilloscope and measuring the pulse width using the oscilloscope. However, this measurement manner is low in accuracy and is slow in measurement.

Therefore, researching a hardware demodulation circuit for measuring a pulse width to improve the accuracy of data analysis is a technical problem that urgently needs to be solved by those skilled in the art.

SUMMARY

According to the present disclosure, in a first aspect, the present disclosure provides a demodulation circuit, including an analysis circuit, a sampling circuit, and a sampling control circuit, where the sampling circuit is respectively connected to the analysis circuit and the sampling control circuit; the analysis circuit is configured to receive a first signal outputted by a hard disk state pin, and analyze a high-level signal and a low-level signal in the first signal, so as to obtain a first pulse width corresponding to the high-level signal and a second pulse width corresponding to the low-level signal, where the first signal includes hard disk data; and the sampling control circuit is configured to trigger, according to the first signal, the sampling circuit to sample the first pulse width and the second pulse width such that the hard disk data corresponding to the first signal is analyzed according to the sampled first pulse width and second pulse width, so as to realize the monitoring of a hard disk.

According to the embodiments of the present disclosure, in a second aspect, the present disclosure further provides a server, including a hard disk and the above demodulation circuit. The demodulation circuit is connected to the hard disk, and is configured to receive a first signal outputted by a hard disk state pin of the hard disk, and demodulate hard disk log data according to the first signal, so as to realize the monitoring of the hard disk. The first signal includes hard disk data.

The details of one or more embodiments of the present disclosure are set forth in the drawings and the description below. Other features and advantages of the present disclosure will be apparent from the drawings and the claims from the specification.

BRIEF DESCRIPTION OF THE DRAWINGS

In order to describe the technical solutions in embodiments of the present disclosure more clearly, the drawings required to be used in the prior art and the embodiments will be simply introduced below. It is apparent that the drawings in the following descriptions are only some embodiments of the present disclosure. Those of ordinary skill in the art may further obtain other drawings according to these drawings without creative work.

DETAILED DESCRIPTION OF THE EMBODIMENTS

Figure 1:
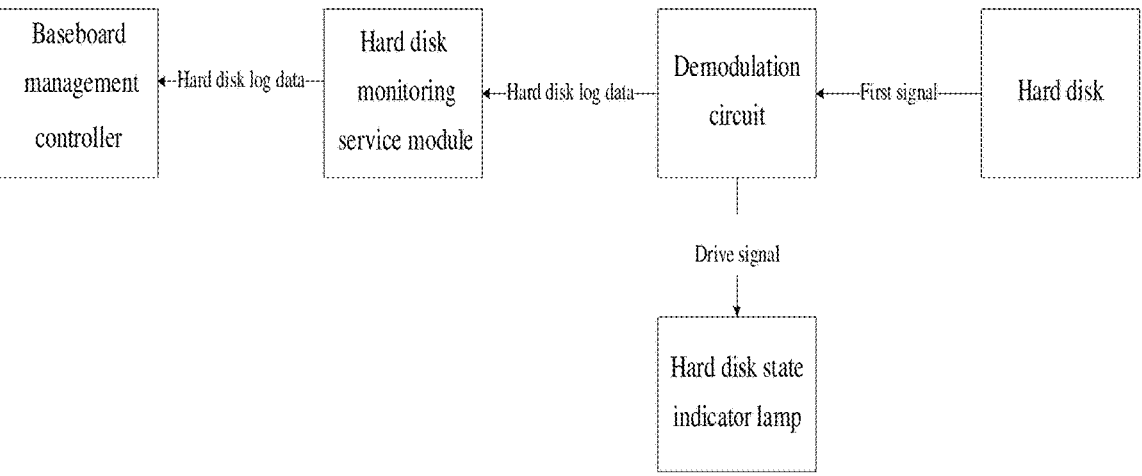
FIG. 1 is a schematic diagram of a system in which a demodulation circuit is located according to one or more embodiments of the present disclosure.

The core of the present disclosure is to provide a demodulation circuit and a server, and circuit modules act together to realize accurate analysis of hard disk data. Due to a high response speed of a hardware circuit, the efficiency of analyzing the hard disk data may be improved. The present disclosure also uses a hard disk state pin for outputting a hard disk state signal to output a first signal with the hard disk data, so as to acquire and analyze hard disk monitoring data without affecting an original function of a hard disk, thereby achieving the monitoring of the hard disk.

In order to make objectives, technical solutions, and advantages of embodiments of the present disclosure clearer, the technical solutions in the embodiments of the present disclosure will be clearly and completely described below in combination with the drawings in the embodiments of the present disclosure. It is apparent that the described embodiments are part of the embodiments of the present disclosure, not all the embodiments. All other embodiments obtained by those of ordinary skill in the art on the basis of the embodiments in the present disclosure without creative work all fall within the scope of protection of the present disclosure.

For ease of understanding, contents involved in a hard disk out-of-band monitoring solution are introduced. Out-of-band management means that a network is managed by a dedicated network management channel, network management data is separated from operational data, and an independent channel is built for the network management data. In this channel, only the network management data is transmitted. By separating the network management data from the operational data, the efficiency and reliability of network management may be improved, and the safety of the network management data is also improved.

Since in-band monitoring cannot meet operation and maintenance requirements, after being deployed, a server provides an out-of-band management monitoring function through a Baseboard Management Controller (BMC). The BMC is a special service processor, uses a sensor to monitor the state of a computer, a network server, or other hardware drive devices, and achieve communication through an independent connection line and a system administrator of the device. During practical application, the BMC is generally mounted on a mother board or a main circuit board of a device monitored. The BMC measures internal physical variables by the sensor, such as temperatures, humidity, power supply voltages, fan speeds, communication parameters, Operating System (OS) functions, etc. If any one of these variables exceeds an established limit range, the BMC notifies the system administrator. The BMC may provide a network (web) service, and has a network communication function and provides a webpage to display a monitoring interface. Operations personnel may connect a BMC of the device monitored on a device site via a network cable, or connect the BMCs of a plurality of devices monitored in a data center via a network, so as to acquire monitoring data of the BMCs.

Since the performance and pin number of a BMC circuit in a BMC system are limited, as the number of components to be monitored and projects to be monitored increase, a Complex Programmable Logic Device (CPLD) is usually disposed in the BMC system to share the performance pressure of the BMC circuit and provide more pins to connect the sensor or the components monitored. The CPLD is mainly constituted by a logical block, a programmable interconnect channel, and an input/output block (I/O block). One logical block of the CPLD generally includes 4-20 macro units, and each macro unit is generally constituted by a product-term array, a product-term distribution, and a programmable register. Each macro unit has various configuration manners, may also be used in a cascaded manner, and thus may achieve complex combinational logic and sequential logic functions. An embedded array block with an on-chip Random Access Memory (RAM)/Read-Only Memory (ROM) is also provided for the CPLD with high integration. The programmable interconnect channel mainly provides an interconnection network among the logical block, the macro unit, and the input/output pin. The V/O block provides an interface between internal logic and the device I/O pin.

As an important component of a server, a hard disk is an important object for out-of-band monitoring management. According to types of communication interfaces, a Serial Attached SCSI (SAS)/Serial Advanced Technology Attachment (SATA) interface hard disk and a Non Volatile Memory Host Controller Interface Specification (NVMHCIS or NVM Express, NVMe) interface hard disk are mainly divided. The SAS interface is compatible with the SATA interface. According to types of storage media, the hard disk is also mainly classified into a Hard Disk Drive (HDD) and a Solid State Disk or Solid State Drive (SSD). The HDD is mainly provided with the SAS interface or SATA interface. The SSD includes SAS interface, SATA interface, and NVMe interface hard disks.

It is to be noted that, in an embodiment of the present disclosure, the BMC may only include the BMC circuit, or may also be a system including the BMC circuit and the CPLD. The CPLD may only be a CPLD that is only disposed on a hard disk backplane or a CPLD that is disposed on a server main board.

Further, the reason that the hard disk in the present disclosure selects a hard disk state pin to send data to the BMC is as follows.

The pins of the hard disk are mainly classified into a data pin, a power pin, and a hard disk state pin. The data pin of the hard disk is connected to an in-band system, and the power pin of the hard disk is configured to be connected to a power supply and a ground signal. Therefore, the BMC can only directly access the hard disk state pin of the hard disk.

The hard disk state pin of the hard disk mainly includes a hard disk state indicator pin, a hard disk production debugging pin, and an idle hard disk pin.

The hard disk state indicator pin includes a hard disk in-place indicator pin, the hard disk read/write state indicator pin, etc. The hard disk state indicator pin is a pin of the hard disk that is configured to output a hard disk state indicator signal. For example, the hard disk in-place indicator pin is used for a hard disk to output a hard disk in-place state signal, and the hard disk read/write state indicator pin is used for the hard disk to output a hard disk read/write state signal.

When the hard disk is connected to a hard disk backplane, the hard disk state indicator pin mainly has two connection modes. In the first mode, the hard disk state indicator pin is connected to the BMC to inform the BMC of corresponding hard disk state data; and in the second mode, the hard disk state indicator pin is connected to a control circuit on the hard disk backplane to control a state of a corresponding controlled element, causing a user to learn a corresponding hard disk state. For example, a hard disk state indicator lamp is disposed on the hard disk backplane to indicate a hard disk operating state. When the hard disk is in a read/write state, the hard disk read/write state indicator pin may be controlled to output a square wave signal to an amplification drive circuit of a state indicator lamp, so as to control the hard disk read/write state indicator lamp to turn on; and when the hard disk is not in the read/write state (i.e., an idle state), the state indicator pin is controlled to output a constant level signal (e.g., a constant high-level signal), causing the state indicator lamp to turn off to indicate that it is in the idle state, such that the user learns, by watching the on and off of the state indicator lamp, whether the hard disk device is in the read/write state. The state display of the hard disk based on the hard disk in-place indicator pin is the same. Alternatively, the hard disk may also output two different constant level signals (one high and one low) via these hard disk state indicator pins, so as to indicate different states. The signal may be inputted to the BMC to trigger corresponding recording, processing, or control actions.

The hard disk production debugging pin mainly refers to a pin (debug pin) of the hard disk with an SAS or SATA interface that is near the SAS or SATA interface. These pins are generally used by the hard disk at a production debugging stage. During the practical application of the hard disk, the production debugging pin may be configured to output guidance information at an initialization phase of the hard disk.

On an NVMe interface hard disk, the idle hard disk pin is also included in addition to the above hard disk state indicator pin.

The above hard disk state pin is not the pin used by the hard disk to output data, such that there is no risk of disclosing user data stored in the hard disk. Currently, after the hard disk is inserted into the hard disk backplane, these hard disk state pins are directly connected to the BMC or have the permission to be connected to the BMC.

In the embodiments of the present disclosure, the hard disk state pin of the hard disk used may include at least one of a hard disk state indicator pin, a hard disk production debugging pin, or an idle hard disk pin.

In the embodiments of the present disclosure, if the hard disk state indicator pins such as the hard disk in-place state indicator pin, the hard disk read/write state indicator pin, etc. are used, since these hard disk state pins have generally been connected to a General-Purpose Input/Output (GPIO) pin of the BMC or the I/O pin of the CPLD, a hardware architecture may be used directly without requiring any changes to a hardware architecture of a server, thereby achieving simple and convenient implementation.

The hard disk production debugging pins on the current device are typically suspended, usually including 4 pins. If the embodiments of the present disclosure use the hard disk production debugging pins as the hard disk state pins for outputting hard disk log data, a connector with the corresponding number of pins may be used to connect the hard disk production debugging pins to the GPIO pins of the BMC circuit or the I/O pins of the CPLD.

Since the idle hard disk pin is typically only present in an interface of an NVMe interface hard disk, a high-speed signal cannot be suspended, such that the idle hard disk pin in the current NVMe interface is grounded via a resistor-capacitor circuit on the hard disk backplane after the hard disk is connected to the hard disk backplane. If the embodiments of the present disclosure use the idle hard disk pin as the hard disk state pin for outputting hard disk log data, a connection relationship between the idle hard disk pin and the hard disk backplane is modified as the connection to the GPIO pins of the BMC circuit or the I/O pins of the CPLD.

In the out-of-band system, if the hard disk expansion card has the I2C connected to the BMC circuit, the BMC circuit may access the hard disk expansion card via the I2C, and forward a command or hard disk log data via the hard disk expansion card. Furthermore, in the BMC, the BMC circuit may also be connected to the CPLD via an I2C, and then connected to the hard disk state pin of the hard disk via the CPLD. Alternatively, the BMC circuit may also be directly connected to the hard disk state pin of the hard disk.

As shown in FIG. 1, in order to directly acquire the hard disk log data via the hard disk state pin and not occupy other pins, a demodulation circuit needs to be provided to analyze a first signal outputted by the hard disk via the hard disk state pin. The hard disk data obtained through analysis is transmitted to a hard disk monitoring service module, and after receiving the hard disk data, the hard disk monitoring service module sends an interrupt signal to the BMC, and feeds back the hard disk data to the BMC in response to a data read request sent by the BMC.

Figure 2:
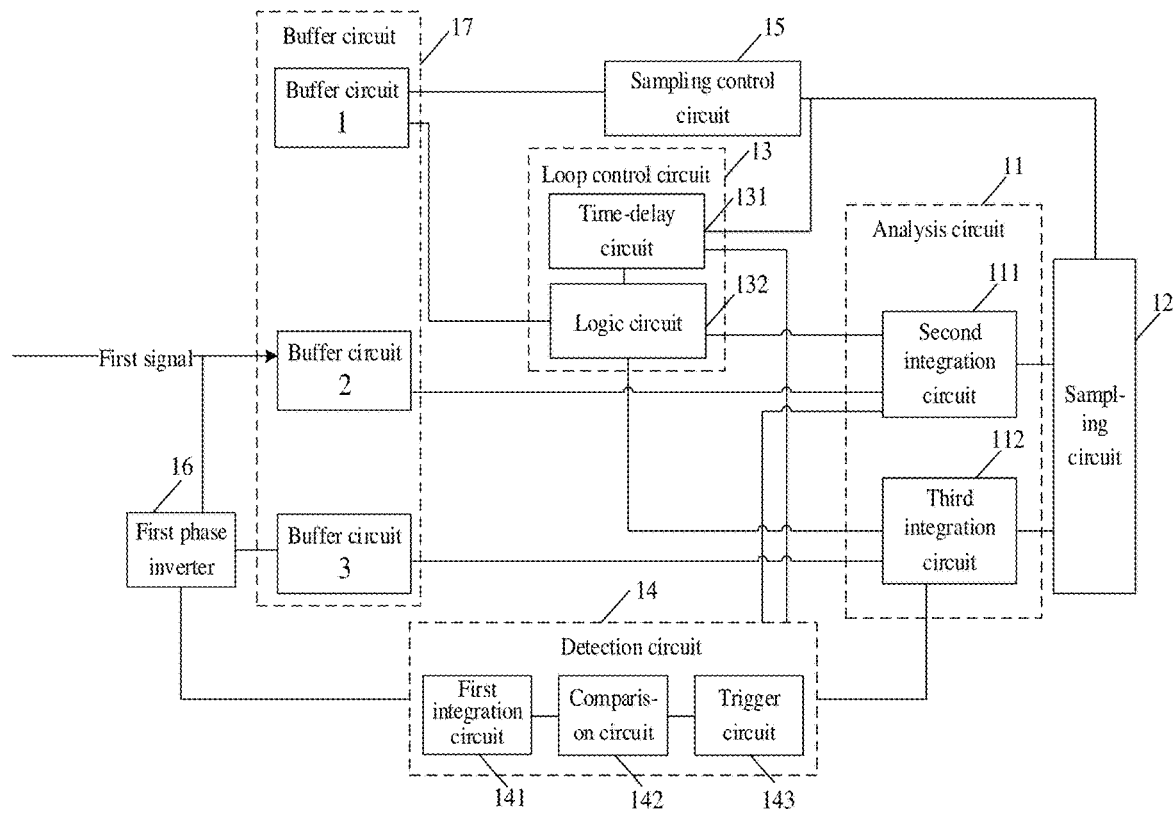
FIG. 2 is a schematic diagram of a demodulation circuit according to one or more embodiments of the present disclosure.

In an embodiment, as shown in FIG. 2, the present disclosure provides a demodulation circuit, including an analysis circuit 11, a sampling circuit 12, and a sampling control circuit 15, where the sampling circuit 12 is respectively connected to the analysis circuit 11 and the sampling control circuit 15; the analysis circuit 11 is configured to receive a first signal outputted by a hard disk state pin, and analyze a high-level signal and a low-level signal in the first signal, so as to obtain a first pulse width corresponding to the high-level signal and a second pulse width corresponding to the low-level signal, where the first signal includes hard disk data; and the sampling control circuit 15 is configured to trigger, according to the first signal, the sampling circuit 12 to sample the first pulse width and the second pulse width such that the hard disk data in the first signal is analyzed according to the sampled first pulse width and second pulse width, so as to realize the monitoring of a hard disk.

The demodulation circuit in the embodiment includes the analysis circuit 11, the sampling circuit 12, and the sampling control circuit 15. The analysis circuit 11 is configured to receive the first signal outputted by the hard disk state pin, and analyze the first signal. In an embodiment, the high-level signal and the low-level signal are respectively analyzed to obtain the first pulse width corresponding to the high-level signal and the second pulse width corresponding to the low-level signal. The first signal includes the hard disk data, and the hard disk data is configured to realize monitoring. In an embodiment of the present disclosure, the first signal may be a signal that is obtained through modulation by the hard disk according to the hard disk log data and the hard disk state signal corresponding to the hard disk state pin, that is, the hard disk state signal and the hard disk log data may be transmitted at the same time via the hard disk state pin.

The sampling control circuit 15 controls when the sampling circuit 12 samples the first pulse width and the second pulse width. In an embodiment, the sampling control circuit 15 triggers the sampling circuit 12 according to the first signal to ensure that sampling is performed at appropriate timing, thereby facilitating analysis of the hard disk data according to the sampled first pulse width and second pulse width.

The sampling circuit 12 receives the first pulse width and second pulse width outputted by the analysis circuit 11, and samples the first pulse width and second pulse width based on the timing triggered by the sampling control circuit 15. When the first pulse width and the second pulse width are analog signals, the sampling circuit 12 may be an analog-to-digital converter.

The demodulation circuit in the present disclosure may be designed as an independent circuit module, which is directly connected to the hard disk state pin of the hard disk, thereby realizing direct acquisition and analysis of the hard disk log data.

To sum up, the demodulation circuit in the embodiment realizes the accurate analysis of the hard disk data through the cooperation of the analysis circuit 11, the sampling circuit 12, and the sampling control circuit 15. Moreover, this demodulation circuit realizes the acquisition and analysis of the hard disk data by using the first signal outputted by the hard disk state pin, thereby realizing the monitoring of the hard disk. Furthermore, the hardware circuit has a fast processing speed, such that the efficiency of analyzing the hard disk data may be improved.

In an embodiment of the present disclosure, the analysis circuit 11 includes a charging loop and a discharging loop. The demodulation circuit further includes a loop control circuit 13, and the charging loop is respectively connected to the sampling control circuit 15, the loop control circuit 13, and the discharging loop. The charging loop is configured to perform charging according to a preset level signal in the first signal, so as to obtain an i-th pulse width, in a case that the charging loop is turned on. The discharging loop is configured to perform discharging according to a non-preset level signal in the first signal in a case that the discharging loop is turned on. The sampling control circuit 15 is configured to trigger the sampling circuit 12 to sample the i-th pulse width by delaying a first time after the charging loop completes charging. The loop control circuit 13 is configured to control the charging loop to turn on according to the first signal, and control the discharging loop to turn on by delaying a second time after the sampling control circuit 15 triggers the sampling circuit 12 to sample the i-th pulse width. In a case that the preset level signal is the high-level signal, i is one, and in a case that the preset level signal is the low-level signal, i is two.

The components of the analysis circuit 11 are mentioned in the embodiment, and include the charging loop and the discharging loop. The charging loop performs charging according to the preset level signal in the first signal, so as to obtain the i-th pulse width. The discharging loop performs discharging according to the non-preset level signal in the first signal. The loop control circuit 13 is configured to control, according to the first signal, the timing of turning on the charging loop and the discharging loop.

In an embodiment, in a case that the preset level signal is the high-level signal, the charging loop perform charging according to the high-level signal; after charging is completed, in a case that the high-level signal is converted into the low-level signal, under the action of the sampling control circuit 15, the sampling circuit 12 samples, after the first time, the first pulse width corresponding to the high-level signal obtained by the charging loop; and under the action of the loop control circuit 13, the discharging loop is turned on by delaying the second time after the sampling circuit 12 samples the first pulse width corresponding to the high-level signal obtained by the charging loop, so as to realize discharging. In an embodiment, in a case that the preset level signal is the high-level signal, when the loop control circuit 13 may detect a rising edge of the first signal, it means that the high-level signal is detected, and the charging loop is controlled to turn on to perform charging according to the high-level signal, so as to obtain the first pulse width corresponding to the high-level signal; and when a falling edge of the first signal is detected, it means that the high-level signal ends, the charging loop completes charging, in this case, the sampling circuit 12 is triggered to sample the first pulse width, and the discharging loop is controlled to turn on by delaying the first time after the sampling circuit 12 is triggered for sampling, so as to realize discharging.

In an embodiment, in a case that the preset level signal is the low-level signal, the charging loop perform charging according to the low-level signal; after charging is completed, in a case that the low-level signal is converted into the high-level signal, under the action of the sampling control circuit 15, the sampling circuit 12 samples, after the first time, the second pulse width corresponding to the low-level signal obtained by the charging loop; and under the action of the loop control circuit 13, the discharging loop is turned on by delaying the first time after the sampling circuit 121 is triggered to sample the second pulse width, so as to realize discharging. In an embodiment, in a case that the preset level signal is the low-level signal, when the loop control circuit 13 receives the first signal via a first phase inverter 16 and detects a rising edge outputted by the first phase inverter 16, it means that the high-level signal outputted by the first phase inverter 16 is detected, and it also means that the first signal is the low-level signal, the charging loop is turned on and performs charging by using the high-level signal outputted by the first phase inverter 16, so as to obtain the second pulse width corresponding to the low-level signal corresponding to the first signal; and when a falling edge of the first phase inverter 16 is detected, it means that the low-level signal outputted by the first phase inverter 16 is detected, it also means that the first signal is the high-level signal, the charging loop completes charging, in this case, the sampling circuit 12 is triggered to sample the second pulse width, the discharging loop is controlled to turn on by delaying the second time after the sampling circuit 12 is triggered for sampling, and the discharging loop performs discharging by using the low-level signal outputted by the first phase inverter 16.

After charging is completed, the effect of using the control circuit to trigger the sampling circuit 12 to sample by delaying the first time is to ensure that, after the charging loop completes charging, the state of the charging loop is stabilized to ensure the accuracy and stability of data sampling. In an embodiment, by delaying to trigger the sampling circuit 12 to sample, sampling may be performed when the signal is stabilized after the charging loop completes charging, such that data distortion caused by sampling during signal fluctuations or instability is avoided, and data for the first pulse width and the second pulse width is acquired accurately, thereby correctly analyzing the hard disk data.

The effect of controlling the discharging loop to turn on by delaying the second time after the sampling circuit 12 is triggered for sampling is that by giving an enough sampling time to the sampling circuit 12, a parameter (e.g., voltage value) corresponding to the charging loop during sampling is in an unstable state, that is, the stability of an output end of the charging loop is ensured, the sampling process is prevented from being interrupted, and then the discharging loop is controlled to turn on after the second time, ensuring that the sampling circuit 12 may effectively sample the first pulse width or the second pulse width to accurately analyze the hard disk data in the first signal, thereby realizing the accurate monitoring of the hard disk, and improving the performance and stability of the demodulation circuit.

In an embodiment of the present disclosure, the first signal is a signal that is obtained through modulation by the hard disk according to hard disk log data and a hard disk state signal corresponding to the hard disk state pin; the hard disk state pin continuously outputs a first control signal at a first level, in a case that the hard disk is in a preset state, and outputs a second control signal, in a case that the hard disk is in a non-preset state, wherein the second control signal is a rectangular wave signal; in a case that the hard disk is in the preset state, inserts a plurality of pulse signals at a second level in the first control signal, and then segments the first control signal by using the pulse signals, so as to obtain the first signal; in a case that the hard disk is in the non-preset state, codes each data bit in the hard disk log data into a level signal with a preset width corresponding to each data bit, so as to obtain the first signal. The demodulation circuit further includes a detection circuit 14. The detection circuit 14 is connected to the loop control circuit 13. The detection circuit 14 is configured to detect whether the pulse signal is present in the first signal, and adjust the first time and/or the second time according to a detection result.

In an embodiment, the hard disk state pin is a state indicator lamp pin, the state indicator lamp pin continuously outputs the first control signal at the first level, in a case that the hard disk is in the preset state, and outputs the second control signal, in a case that the hard disk is in the non-preset state such that a state indicator lamp flashes. The specific manner that the hard disk modulates the hard disk state signal and the hard disk log signal to obtain the first signal is that, in a case that the hard disk is in the preset state, a plurality of pulse signals at a second level are inserted in the first control signal, such that the first control signal may be segmented by using the pulse signals to a plurality of pulse width signals at the first level. The hard disk log data includes a plurality of data bits, and each data bit corresponds to one pulse width signal at the first level. The analysis circuit 11 determines the corresponding data bit by identifying a pulse width of the pulse width signal at the first level, such that the analysis circuit may be analyzed.

On the basis of the modulation signal, the demodulation circuit is further provided with the detection circuit 14. The detection circuit 14 is connected to the sampling control circuit 15 and the loop control circuit 13. The detection circuit 14 is configured to detect whether the pulse signal is present in the first signal, and adjust, according to a detection result, delay times respectively corresponding to the sampling control circuit 15 and the loop control circuit 13. That is, the detection circuit 14 is mainly configured to control, according to a coding manner of the first signal outputted by the current hard disk state pin, the loop control circuit 13 to control the discharging loop to turn on with different timing sequences.

In an embodiment, in the preset state, a width of the pulse signal is narrow, causing the sampling control circuit 15 to select a short delay time to trigger the sampling circuit 12 for sampling, and causing the loop control circuit 13 to delay a short time to control the discharging loop to turn on, such that changes in the pulse signal can be responded more quickly, and the pulse signal is processed as fast as possible. Therefore, the sensitivity and real-time performance of the system to the pulse signal may be improved, thereby accurately analyzing information carried by the pulse signal. In the non-preset state, when the pulse signal is not present, the sampling control circuit 15 selects a short delay time to trigger the sampling circuit 12 for sampling, and the loop control circuit 13 also delays a short time to control the discharging loop to turn on, so as to stabilize the operation of the system and ensure a normal data processing flow. Since when the pulse signal is not detected, the first signal is a level signal with a large width relative to the pulse signal, and in this case, a longer delay time is required to process a normal data flow, so as to prevent premature interruption or interference with the progress of data processing. Therefore, by selecting a longer delay time, it may ensure that the system can maintain a stable operating state when not detecting the pulse signal, avoiding unnecessary interference or misoperation, and maintaining the smooth proceeding of data processing, thereby improving the stability and reliability of the system.

In an embodiment, the preset state may also be a hard disk in-place state or not-in-place state. When the signal at the first level is continuously outputted in the preset state, this method may also be used, and implementations are the same, such that the present disclosure is not described herein again.

In the embodiment, the sampling control circuit 15 and the loop control circuit 13 control the turn on of the charging loop and the discharging loop according to the signal of the detection circuit 14, and after the charging loop completes charging, the sampling control circuit 15 selects a shorter delay time to trigger the sampling circuit 12 for sampling, and the loop control circuit 13 selects the corresponding delay time to control the discharging loop to turn on, such that the operating state of the demodulation circuit may be controlled according to information in the first signal, thereby achieving the monitoring of the hard disk state and the analysis reliability of the hard disk data.

The specific manner that the hard disk modulates the hard disk state signal and the hard disk log signal to obtain the first signal is that, in a case that the hard disk is in the non-preset state, each data bit in the hard disk log data is coded into a level signal with a preset width corresponding to each data bit, that is, different information in the hard disk log data is indicated by different level signals, so as to obtain the first signal. In an embodiment, there are two manners of coding each data bit into the level signal with the preset width. The first manner is that, each data bit is coded into a pulse width signal with a corresponding duty cycle, that is, each data bit corresponds to the same cycle, different data bits correspond to different duty cycles, and the analysis circuit 11 may identify the current data bit by determining the duty cycle of each cycle, thereby realizing analysis of the hard disk log data. The second manner is that, each data bit is coded into the level signal with the preset width, and in a case that the level signals of the two adjacent data bits are opposite or the level signals of the two adjacent data bits are the same, an opposite level signal with a certain width is inserted between two adjacent data bits, so as to achieve a spacing between the two adjacent data bits. For example, a first data bit is coded into a high level with a first width, a second data bit is coded into a low level with a second width, and so on; alternatively, the first data bit is coded into the first width, the second data bit is coded into the second width, both high and low levels are available, and a spacing is achieved by inserting the opposite level between the two data bits. Then, the analysis circuit 11 may determine the corresponding data bit by identifying a pulse width of each level, realizing the analysis of the hard disk log data, thereby realizing the monitoring of the hard disk.

In an embodiment of the present disclosure, the detection circuit 14 is configured to control the sampling control circuit 15 to operate in a first mode in a case that determining the pulse signal is present in the first signal, and control the sampling control circuit 15 to operate in a second mode in a case that determining the pulse signal is not present in the first signal. The sampling control circuit 15 is configured to, in response to operating in the first mode, trigger the sampling circuit 12 to sample the i-th pulse width by delaying a first preset time after the charging loop completes charging, and in response to operating in the second mode, trigger the sampling circuit 12 to sample the i-th pulse width by delaying a second preset time, wherein the first preset time is less than the second preset time, and the first time is the first preset time or the second preset time.

In an embodiment, the operation mode of the sampling control circuit 15 is adjusted by the detection result of the detection circuit 14, thereby realizing the adjustment of the first time. In an embodiment, in a case that the pulse signal is present, a small first preset delay time is selected to trigger the sampling circuit 12, and since the pulse width of the pulse signal is small, the pulse signal needs to be sampled and processed as fast as possible, so as to ensure that key information is acquired timely. A small delay time (first preset time) may ensure that sampling can be triggered rapidly after the pulse signal appears, thereby reducing information loss or delay. In an embodiment, in a case that the pulse signal is not present, a large second preset delay time is selected to trigger the sampling circuit 12, and since the width of each level in the first signal is larger than the width of the pulse signal, a large delay time may be selected to reduce requirements of the system for resources, thereby saving energy consumption and reducing unnecessary data sampling. Furthermore, through the large delay time, sampling may be performed when a signal is stabilized, thereby avoiding resource waste and system burden caused by frequent sampling.

To sum up, in an embodiment, different delay time strategies are selected to trigger the sampling circuit 12 according to the presence of the pulse signal and timeliness and accuracy requirements for data sampling, such that system resource utilization, real-time performance, and data sampling effectiveness may be better balanced.

In an embodiment of the present disclosure, the detection circuit 14 is configured to control the loop control circuit 13 to operate in a third mode when determining that the pulse signal is present in the first signal, and control the loop control circuit 13 to operate in a fourth mode when determining that the pulse signal is not present in the first signal.

The loop control circuit 13 is configured to, after the sampling control circuit triggers the sampling circuit to sample the i-th pulse width, in response to operating in the third mode, control the discharging loop to turn on by delaying a third preset time, and in response to operating in the fourth mode, control the discharging loop to turn on by delaying a fourth preset time, wherein the third preset time is less than the fourth preset time, and the second time is the third preset time or the fourth preset time. In an embodiment, the operation mode of the loop control circuit 13 is adjusted by the detection result of the detection circuit 14, thereby realizing the adjustment of the second time. In an embodiment, in a case that the pulse signal is present, a small third preset delay time is selected to control the discharging loop to turn on, and the pulse width of the pulse signal is small and needs to be processed as fast as possible, so as to ensure the efficiency of timely analyzing the hard disk data. A small delay time (third preset time) may ensure that discharging can be performed rapidly after the pulse signal appears, thereby improving data processing efficiency. In the embodiment, in a case that the pulse signal is not present, a large fourth preset time is selected to control the discharging loop to turn on, and since the width of each level in the first signal is larger than the width of the pulse signal, a large delay time may be selected to reduce requirements of the system for resources, thereby saving energy consumption and reducing unnecessary data sampling. Furthermore, through the large delay time, it may ensure that the sampling circuit 12 samples when the signal is stabilized, thereby avoiding inaccurate sampling.

In an embodiment, the loop control circuit 13 and the sampling control circuit 15 are connected to together realize the fact that the sampling control circuit 15 triggers the sampling circuit 12 by delaying the third time and the loop control circuit 13 controls the discharging loop to turn on by delaying the first preset time (i.e., the loop control circuit 13 delays the first time) on the basis of the third time; or to together realize the fact that the sampling control circuit 15 triggers the sampling circuit 12 by delaying the fourth time, and the loop control circuit 13 controls the discharging loop to turn on by delaying the second preset time (i.e., the loop control circuit 13 delays the second time) on the basis of the fourth time.

In an embodiment, that the loop control circuit 13 is disposed after the sampling control circuit 15 is to cause the loop control circuit 13 to perform corresponding time-delay control according to an output signal of the sampling control circuit 15, and give a sampling time to the sampling circuit 12 to ensure that the discharging loop is correctly turned on after sampling is completed.

In an embodiment, in the preset state, the hard disk state signal is a constant level signal. The process that the hard disk perform modulation according to the hard disk log data and the hard disk state signal to obtain the first signal includes: each data bit is coded into a pulse signal with a certain voltage amplitude, the first signal includes a plurality of pulse signals corresponding to the plurality of data bits on a one-to-one basis, a preset time interval is present between two adjacent pulse signals, the hard disk log data includes the plurality of data bits, each data bit has a preset mapping relationship with the voltage amplitude, and the level of the constant level signal is opposite to the level of the pulse signal.

The first signal formed by the plurality of pulse signals and the constant level signal is still a pulse width signal theoretically, and may still represent whether the hard disk is in the preset state, and the hard disk log data and the hard disk state signal are coded through the hard disk state pin and pulse amplitude modulation.

In this case, the demodulation circuit determines the data bit corresponding to each pulse signal by analyzing the voltage amplitude corresponding to each pulse signal, thereby realizing analysis of the hard disk log data. In a case that a demodulation module is implemented by a circuit, the demodulation module may include the detection circuit and a voltage measurement circuit; and the detection circuit is configured to detect whether the pulse signal is present, and if so, measure the voltage amplitude of the pulse signal by using the voltage measurement circuit.

As shown in FIG. 2, in an embodiment of the present disclosure, the detection circuit 14 includes a first integration circuit 141, a comparison circuit 142, and a trigger circuit 143; the trigger circuit 143 is respectively connected to the sampling control circuit 15 and the loop control circuit 13; the first integration circuit 141 is configured to integrate a signal at the second level in the first signal, so as to obtain a first integral value; the comparison circuit 142 is configured to compare the first integral value with a first preset integral value and a second preset integral value respectively, output a first triggering signal in response to the first integral value being greater than the first preset integral value, and output a second triggering signal in response to the first integral value being greater than the second preset integral value, where the first preset integral value is less than the second preset integral value; and the trigger circuit 143 is configured to adjust the first time and/or the second time according to the first triggering signal or the second triggering signal.

Figure 3:
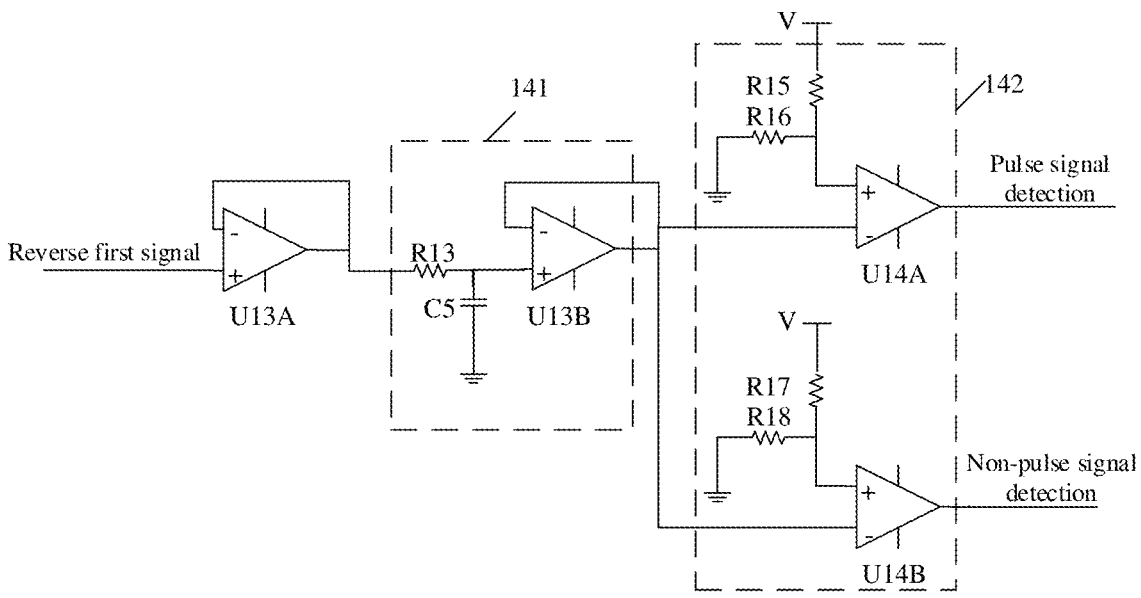
FIG. 3 is a partial schematic diagram of a detection circuit according to one or more embodiments of the present disclosure.

As shown in FIG. 3, in an embodiment of the present disclosure, the first integration circuit 141 includes a third amplifier U13B, a fifth capacitor C5, and a thirteenth resistor R13; the comparison circuit 142 includes a third comparator U14A, a fourth comparator U14B, a first reference circuit, and a second reference circuit; the trigger circuit 143 includes a trigger; a first end of the thirteenth resistor R13 is connected to the hard disk state pin via a first phase inverter 16, a second end of the thirteenth resistor R13 is connected to an input positive end of a third amplifier U13B and a first end of the fifth capacitor C5, respectively; a second end of the fifth capacitor C5 is grounded; an input negative end of the third amplifier U13B is connected to an output end of the third amplifier U13B, an input negative end of the third comparator U14A, and an input negative end of the fourth comparator U14B; an input positive end of the third comparator U14A is connected to the first reference circuit; an input positive end of the fourth comparator U14B is connected to the second reference circuit; an output end of the third comparator U14A is connected to a first input end of the trigger; an output end of the fourth comparator U14B is connected to a second input end of the trigger; an output end of the trigger is an output end of the detection circuit 14; a first reference voltage outputted by the first reference circuit is less than a second reference voltage outputted by the second reference circuit.

In an embodiment, referring to FIG. 3, in FIG. 3, the output end of the first integration circuit 141 is the output end of the third amplifier U13B. In a case that the second level is a low level, the manner that the first integration circuit 141 integrates the pulse signal at the second level may include: level inversion is performed on the first signal by using the first phase inverter 16, in this case, the level corresponding to the pulse signal is a high level, and a signal waveform outputted by the third amplifier U13B is a triangle wave obtained by integrating the high-level signal outputted by the first phase inverter 16.

The first reference circuit in the comparison circuit 142 is a first voltage dividing circuit constituted by R15 and R16, and the second reference circuit is a second voltage dividing circuit constituted by R17 and R18. A first reference voltage provided by the first reference circuit is less than a second reference voltage provided by the second reference circuit. If the pulse signal is present, a voltage of a peak value of the triangle wave outputted by the U13B should be small; and if the pulse signal is not present, the voltage of the peak value of the triangle wave outputted by the U13B should be large. The triangle wave is compared with the first reference voltage and the second reference voltage; in a case that the triangle wave is greater than the first reference voltage, it is determined that the pulse signal is present; and in a case that the triangle wave is greater than the second reference voltage, it is determined that the pulse signal is not present, and the level signal with the preset width is normally coded.

Figure 4:
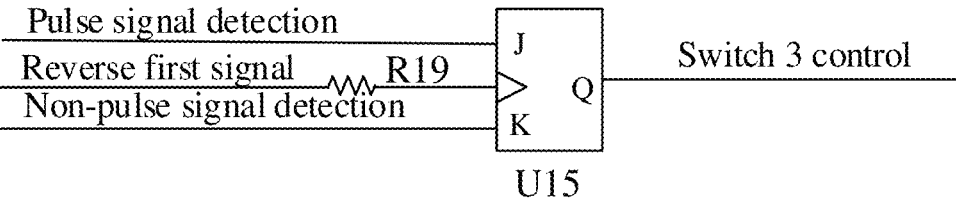
FIG. 4 is a schematic diagram of a trigger circuit according to one or more embodiments of the present disclosure.

The trigger circuit 143 may be a JK trigger. As shown in FIG. 4, a J end of the JK trigger is connected to the output end of the third comparator U14A, a K end of the JK trigger is connected to the output end of the fourth comparator U14B, a CLK end (not shown in FIG. 4) of the JK trigger is connected to the output end of the first phase inverter 16 (the output end of the first phase inverter 16 may also be connected to the CLK end via R19, thereby improving the reliability of inputting the reverse first signal to the JK trigger), so as to input the reverse first signal, and a Q end of the JK trigger is the output end of the detection circuit 14. A true value table of the JK trigger is shown in Table 1.

TABLE 1

| Input signal | Pulse signal J | Non-pulse signal K | Qnext | Action |
|---|---|---|---|---|
| 1 | 0 | 0 | X | Remain unchanged |

TABLE 1-continued

| Input signal | Pulse signal J | Non-pulse signal K | Qnext | Action |
|---|---|---|---|---|
| 0 | 0 | 1 | 0 | Reset |
| 0 | 1 | 0 | 1 | Set |

In the detection circuit 14, parameter design meets the following:

$$E * e^{\frac{-t1}{R16\,C5}} > V\frac{R15}{R14+R15} > E * e^{\frac{-te}{R16\,C5}};$$

$$R16 \times C5 = t2\,/\,5;$$

$$E * e^{\frac{-t1}{R16\,C5}} > V\frac{R18}{R17+R18},$$

where E is an output upper limit of an amplifier, $$V\frac{R15}{R14+R15}$$

is a voltage value at a junction between R14 and R15, the is a duration of the pulse signal, and t1 is a shortest pulse width when there is no pulse signal, $$V\frac{R18}{R17+R18}$$

is a voltage value at a junction between R17 and R18.

In an embodiment, a buffer circuit U13A is disposed between the first end of the thirteenth resistor R13 and the output end of the first phase inverter 16, and is configured to buffer the reverse first signal to ensure the operation reliability of the rear end detection circuit 14 based on the reverse first signal.

In an embodiment of the present disclosure, the loop control circuit 13 includes a time-delay circuit 131 and a logic circuit 132.

An output end of the time-delay circuit 131 is connected to a first input end of the logic circuit 132, a control end of the time-delay circuit 131 is connected to the detection circuit 14, a second input end of the logic circuit 132 is connected to the hard disk state pin, and an output end of the logic circuit 132 is respectively connected to the charging loop and the discharging loop.

The time-delay circuit 131 is configured to output the first signal by delaying the second time.

The logic circuit 132 is configured to perform a logical operation according to a first signal outputted by the time-delay circuit 131 and a first signal outputted by the hard disk state pin, so as to output a first turn-on signal when detecting a starting edge of a preset level signal of the first signal outputted by the hard disk state pin, and output a second turn-on signal when detecting an end edge of a preset level signal of the first signal outputted by the time-delay circuit 131.

The charging loop is configured to be turned on, in a case that receiving the first turn-on signal to perform charging according to the preset level signal, so as to obtain the i-th pulse width.

The discharging loop is configured to be turned on, in a case that receiving the second turn-on signal to perform discharging according to the non-preset level signal.

In an embodiment, the loop control circuit 13 includes two portions, which respectively are the a time-delay circuit 131 and the logic circuit 132. The effect of the time-delay circuit 131 in the demodulation circuit is to delay the first signal by the first time and then output the first signal. In an embodiment, in a case that receiving the first signal outputted by the hard disk state pin, the time-delay circuit 131 delays the first time and then outputs the signal. The logic circuit 132 is configured to perform the logical operation according to the first signal outputted by the time-delay circuit 131 and the first signal outputted by the hard disk state pin. In an embodiment, the logic circuit 132 has two input ends, one input end is connected to the output end of the time-delay circuit 131, and the other input end is connected to the hard disk state pin. Two output ends are also provided at the same time, and are respectively connected to the charging loop and the discharging loop. The logic circuit 132 outputs the first turn-on signal when detecting the starting edge of the preset level signal of the first signal outputted by the hard disk state pin, the charging loop is turned on to perform charging according to the preset level signal, thereby obtaining a specific pulse width, which is the i-th pulse width. The logic circuit 132 turns on the discharging loop when detecting the end edge of the preset level signal of the first signal outputted by the time-delay circuit 131, so as to perform the discharging operation according to the non-preset level signal.

Since the time-delay circuit 131 plays a role in outputting the first signal by delaying the first time, in an embodiment, the time-delay circuit 131 is connected to the logic circuit, such that at the start of an edge (rising edge or falling edge) of a level, the charging loop is triggered to perform charging accordingly, and at the end of the edge (falling edge or rising edge) of the level, the discharging loop is triggered to perform discharging accordingly by delaying the first time.

In an embodiment, the cooperation of the time-delay circuit 131 and the logic circuit 132 in the loop control circuit 13, the charging loop and the discharging loop are controlled to turn on through logic determination and time-delay operations, thereby realizing the processing and analysis of the hard disk state signal.

In an embodiment of the present disclosure, the charging loop includes a first charging loop and a second charging loop, and the discharging loop includes a first discharging loop and a second discharging loop. A first output end of the logic circuit 132 is respectively connected to a control end of the first charging loop and a control end of the first discharging loop; the hard disk state pin is connected to an input end of the first charging loop, an input end of the first discharging loop, an input end of the second charging loop, and an input end of the second discharging loop; the sampling circuit 12 is respectively connected to an output end of the first charging loop and an output end of the second charging loop; and a second output end of the logic circuit 132 is respectively connected to a control end of the second charging loop and a control end of the second discharging loop. The first charging loop is configured to be turned on when the logic circuit 132 detects a rising edge of the first signal outputted by the hard disk state pin, so as to start charging, and be cut off in a case that the logic circuit 132 detects a falling edge of the first signal outputted by the hard disk state pin, so as to stop charging, thereby obtaining a first charging voltage value corresponding to the high-level signal. The first discharging loop is configured to be turned on when the logic circuit 132 detects a falling edge of the first signal outputted by the time-delay circuit 131, so as to start discharging. The second charging loop is configured to be turned on when the logic circuit 132 detects the falling edge of the first signal outputted by the hard disk state pin, so as to start charging, and be cut off when the logic circuit 132 detects the rising edge of the first signal outputted by the hard disk state pin, so as to stop charging, thereby obtaining a second charging voltage value corresponding to the low-level signal in the first signal. The second discharging loop is configured to be turned on when the logic circuit 132 detects a rising edge of the first signal outputted by the time-delay circuit 131, so as to start discharging. The sampling control circuit 15 is configured to trigger the sampling circuit 12 to sample the first charging voltage value by delaying the first time after the first charging loop completes charging, and trigger the sampling circuit 12 to sample the second charging voltage value after the second charging loop completes charging.

In an embodiment, the specific composition of the charging loop and the discharging loop, as well as a connection relationship among the logic circuit 132, the hard disk state pin, and the sampling circuit 12. In an embodiment, the charging loop includes the first charging loop and the second charging loop. The first charging loop is configured to be turned on when the logic circuit 132 detects the rising edge of the first signal outputted by the hard disk state pin, so as to start charging, and be cut off when the logic circuit 132 detects the falling edge of the first signal outputted by the hard disk state pin, so as to stop charging, such that the first charging voltage value corresponding to the high-level signal may be obtained. The second charging loop is configured to be turned on when the logic circuit 132 detects the falling edge of the first signal outputted by the hard disk state pin, so as to start charging, and be cut off when the logic circuit 132 detects the rising edge of the first signal outputted by the hard disk state pin, so as to stop charging, such that the second charging voltage value corresponding to the low-level signal may be obtained.

The discharging loop includes a first discharging loop and a second discharging loop. The first discharging loop is configured to be turned on when the logic circuit 132 detects the falling edge of the first signal outputted by the time-delay circuit 131, so as to start discharging, that is turned on in a time-delay manner after the first charging loop completes charging, so as to start discharging. The second discharging loop is cut off when the logic circuit 132 detects the rising edge of the first signal outputted by the time-delay circuit 131, so as to stop discharging, that is, turned on in a time-delay manner after the second charging loop completes charging, so as to start discharging.

In an embodiment, the sampling control circuit 15 triggers the sampling circuit 12 to sample the first charging voltage value in a case that the first charging loop completes charging according to the high-level signal (i.e., detecting the falling edge of the first signal outputted by the hard disk state pin), and triggers the sampling circuit 12 to sample the second charging voltage value in a case that the second charging loop completes charging according to the low-level signal (i.e., detecting the rising edge of the first signal outputted by the hard disk state pin). The first charging voltage value and the second charging voltage value respectively represent the width of the high-level signal and the width of the low-level signal. The first pulse width and the second pulse width may be determined by the sampled first charging voltage value and second charging voltage value, such that the hard disk log data in the first signal is analyzed, thereby realizing the monitoring of the hard disk.

In an embodiment, the structure and function design may effectively monitor and analyze the hard disk state. Through the cooperation of the charging/discharging loop, the logic circuit 132, and the sampling control circuit 15, the effective monitoring and data acquisition of the hard disk.

Figure 5:
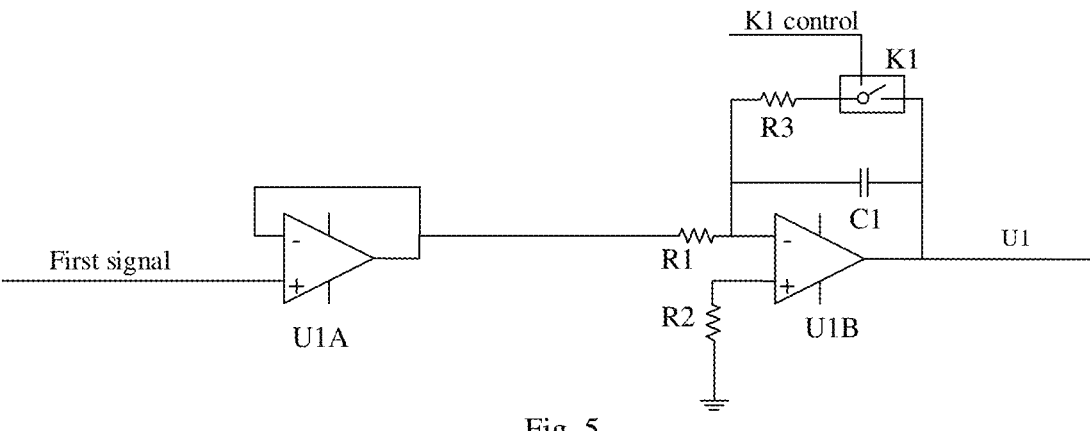
FIG. 5 is a schematic diagram of a second integration circuit according to one or more embodiments of the present disclosure.

As shown in FIG. 5, in an embodiment of the present disclosure, in a case that a second integration circuit 111 includes the first charging loop and the first discharging loop, a circuit structure of the second integration circuit 111 includes a first resistor R1, a second resistor R2, a third resistor R3, a first capacitor C1, a first switch K1, and a first amplifier U1B.

A first end of the first resistor R1 is connected to the hard disk state pin, and a second end of the first resistor R1 is respectively connected to an input negative end of the first amplifier U1B, a first end of the first capacitor C1, and a first end of the third resistor R3; a second end of the third resistor R3 is connected to a first end of the first switch K1, and a second end of the first switch K1 is connected to a second end of the first capacitor C1 and an output end of the first amplifier U1B, respectively; a first end of the second resistor R2 is grounded, and a second end of the second resistor R2 is connected to an input positive end of the first amplifier U1B; a control end of the first switch K1 is connected to the output end of the logic circuit 132. The first switch K1 is configured to be disconnected when the logic circuit 132 detects the rising edge of the first signal outputted by the hard disk state pin such that the first capacitor C1 is charged via the first resistor R1, and be turned off when the logic circuit 132 detects the falling edge of the first signal outputted by the time-delay circuit 131 such that the first capacitor C1 is discharged via the third resistor R3.

In an embodiment, a buffer circuit 17 (U1A in FIG. 5) is disposed between the first end of the first resistor R1 and the hard disk state pin, and is configured to buffer the first signal, thereby improving the operation reliability of the rear end second integration circuit 111.

In FIG. 5, R1 is a charging resistor, R3 is a discharging resistor, C1 is a charging capacitor, and in a case that K1 is disconnected, C1 may be charged via R1; in a case that K1 is turned off, C1 may be discharged via R3; K1 is a two-way single pole switch, where R1=R2=100R3; in order to achieve full discharging under the pulse signal, a ratio between R3 and R1/R2 is 100; and the output signal is connected to the sampling circuit 12 (e.g., in an analog-to-digital converter, the first charging voltage value outputted by the second amplifier U2B is converted into a digital signal).

The output voltage of the first amplifier U1B is U1, a voltage output at the high level of a single-wire communication protocol is u, the low level is 0, the output upper limit of all the amplifiers is E, and u≥E, a high-level integration time is $t_h$, and a low-level integration time is $t_l$; R1=R (a resistance value of the first resistor R1), and C1=C (a capacitance value of the first capacitor); and then an instantaneous value U1(t) of the output voltage of the first amplifier U1B is as follows:

$$U1 = -\frac{1}{C}\int\frac{E}{R1}dt_h = -\frac{Et_h}{RC}.$$

The output voltage U1 is directly proportional to the output time t, parameter selection is performed according to an actual circuit, and U1 reaches a maximum value U1max within a $t_h$ phase, ensuring U1max<E.

A discharging process is a discharging loop consisting of C1 and R3, and the instantaneous voltage U1(t) during discharging meets the following.

$$U1(t) = U1\max * e^{\frac{-t}{R3C}} = U1\max * e^{\frac{-10t}{RC}},$$

R3 is a resistance value of the third resistor.

Figure 6:
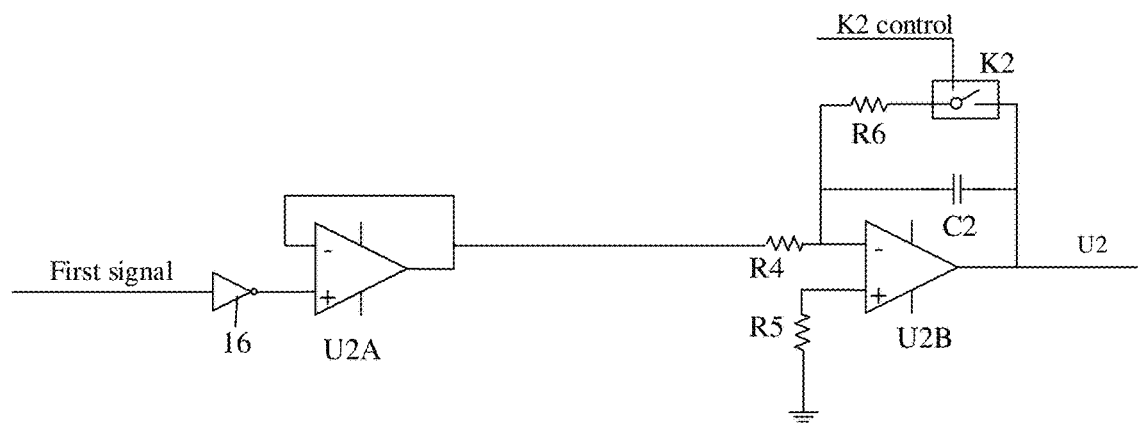
FIG. 6 is a schematic diagram of a third integration circuit according to one or more embodiments of the present disclosure.

As shown in FIG. 6, in an embodiment of the present disclosure, a third integration circuit 112 includes the second charging loop and the second discharging loop, a circuit structure of the third integration circuit 112 includes a first phase inverter 16, a fourth resistor R4, a fifth resistor R5, a sixth resistor R6, a second capacitor C2, a second switch K2, and a second amplifier U2B.

A first end of the fourth resistor R4 is connected to the hard disk state pin via the first phase inverter 16, and a second end of the fourth resistor R4 is connected to an input negative end of the second amplifier U2B, a first end of the second capacitor C2, and a first end of the sixth resistor R6, respectively; a second end of the sixth resistor R6 is connected to a first end of the second switch K2, and a second end of the second switch K2 is connected to a second end of the second capacitor C2 and an output end of the second amplifier U2B, respectively; a first end of the fifth resistor R5 is grounded, and a second end of the fifth resistor R5 is connected to an input positive end of the second amplifier U2B; a control end of the second switch K2 is connected to the output end of the logic circuit 132.

The second switch K2 is configured to be disconnected when the logic circuit 132 detects the falling edge of the first signal outputted by the hard disk state pin such that the second capacitor C2 is charged via the fourth resistor R4, and be turned off when the logic circuit 132 detects the rising edge of the first signal outputted by the time-delay circuit 131 such that the second capacitor C2 is discharged via the sixth resistor R6.

Further, a buffer circuit U2A is disposed between the first end of the fourth resistor R4 and the first phase inverter 16, and is configured to buffer the first signal, thereby improving the operation reliability of the rear end third integration circuit 112.

The effect of D1 is to invert the level of the first signal, and the buffer circuit 17 consisting of U2A and U2B form the third integration circuit 112 (configured to integrate the low-level pulse width). R4 is a charging resistor, R6 is a discharging resistor, C2 is a charging capacitor, and when K2 is disconnected, C2 may be charged via R4; when K2 is turned off, C1 may be discharged via R6; K2 is a two-way single pole switch, where R4=R5=10R6; and the output second charging voltage value signal is connected to the sampling circuit 12 (e.g., the analog-to-digital converter is configured to convert the second charging voltage value into the digital signal).

A voltage of the output end of U2B is U2, R4=R1=R, and C1=C2=C;

$$\text{Then } U2 = -\frac{1}{C}\int\frac{E}{R}dt_l = -\frac{Et_l}{RC}.$$

Figure 7:
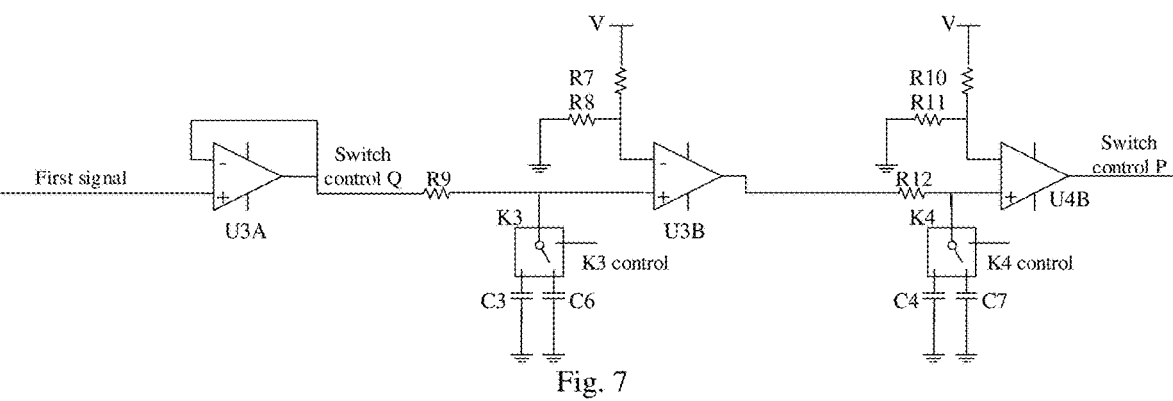
FIG. 7 is a schematic diagram of a sampling control circuit and a time-delay circuit according to one or more embodiments of the present disclosure.

As shown in FIG. 7, in an embodiment of the present disclosure, the sampling control circuit 15 includes a seventh resistor R7, an eighth resistor R8, a ninth resistor R9, a third capacitor C3, a sixth capacitor C6, a third switch K3, and a first comparator U3B.

A first end of the ninth resistor R9 is connected to the hard disk state pin, and a second end of the ninth resistor R9 is respectively connected to a first end of the third switch K3 and an input positive end of the first comparator U3B; a second end of the third switch K3 is grounded via the third capacitor C3, and a third end of the third switch K3 is grounded via the sixth capacitor C6; a first end of the seventh resistor R7 is connected to a power supply module V, and a second end of the seventh resistor R7 is respectively connected to a first end of the eighth resistor R8 and an input negative end of the first comparator U3B; a second end of the eighth resistor R8 is grounded; an output end of the first comparator U3B is connected to the sampling circuit 12; a capacitance value of the third capacitor C3 is greater than a capacitance value of the sixth capacitor C6.

The first end and second end of the third switch K3 are turned on when the sampling control circuit 15 operates in the second mode, and the first end and third end of the third switch K3 are turned on when the sampling control circuit 15 operates in the first mode.

In FIG. 7, U3A forms the buffer circuit 17, a signal is outputted to a RC filter circuit consisting of R9 and C3/C6, a signal of the input positive end of U3B is a triangular wave signal for C3/C6 capacitor charging and discharging, the triangular wave signal is compared with voltages set by R7 and R8, and U3B is a comparator circuit. The setting of the C3/C6 capacitor is related to the operation mode (i.e., delay time) of the sampling control circuit 15.

K3 is a single pole double throw switch and configured to switch an integration capacitor; C3 is a bulk capacitor and configured to perform data conversion timing control when there is no pulse signal; and C6 is a small-capacity capacitor and configured to perform data conversion timing control when the pulse signal is present.

Parameter selection for C6 needs to meet an integral saturation requirement for a pulse signal duration te, that is, R9×C6=te/5.

R9 and C3 form the filter circuit; a voltage on C3 is set to Uc3; and in a case that a starting voltage of Uc3 is 0 V, an instantaneous voltage $U_{C3}$ (t) of the RC filter circuit during charging is as follows.

$$U_{C3}(t) = E\left(1 - e^{\frac{-t}{R9\,C_3}}\right).$$

lp;-lp

In order to ensure that C3 completely discharges electric charges during discharging, and the shortest pulse width t1 when there is no pulse signal can also reach a maximum voltage, that is, Uc3max=E, R9×C3=t2/5 is taken.

The instantaneous voltage $U_{C3}$ (t) of the first end during discharging:

$$U_{C3}(t) = E\left(1 - e^{\frac{-t}{R9\,C_3}}\right).$$

A waveform L1 of a logic signal outputted by the sampling control circuit 15 is constituted by the comparator circuit formed by U3B, $$L1 = \begin{cases} 1 & \left(V\dfrac{R8}{R7+R8} < U_{C3}(t)\right) \\ 0 & \left(V\dfrac{R8}{R7+R8} > U_{C3}(t)\right) \end{cases}, \text{ where } V\dfrac{R8}{R7+R8}\,V\dfrac{R8}{R7+R8}$$

is a voltage value of the second end of R7.

As shown in FIG. 7, in an embodiment of the present disclosure, the time-delay circuit 131 includes a tenth resistor R10, an eleventh resistor R11, a twelfth resistor R12, a fourth capacitor C4, a seventh capacitor C7, a fourth switch K4, and a second comparator U3B.

A first end of the tenth resistor R10 is connected to a power supply module V, and a second end of the tenth resistor R10 is respectively connected to a first end of the eleventh resistor R11 and an input negative end of the second comparator U3B; a second end of the eleventh resistor R11 is grounded; a first end of the twelfth resistor R12 is connected to an output end of the sampling control circuit 15, and a second end of the twelfth resistor R12 is respectively connected to a first end of the fourth switch K4 and an input positive end of the second comparator U3B; a second end of the fourth switch K4 is grounded via the fourth capacitor C4, and a third end of the fourth switch K4 is grounded via the seventh capacitor C7; an output end of the second comparator U3B is connected to the first input end of the logic circuit 132; a capacitance value of the fourth capacitor C4 is greater than a capacitance value of the seventh capacitor C7.

The first end and second end of the fourth switch K4 are turned on, in a case that the time-delay circuit 131 operates in the fourth mode, and the first end and third end of the fourth switch K4 are turned on, in a case that the fourth operates in the third mode.

The operation principle of the time-delay circuit 131 is the same as the operation principle of the sampling control circuit 15. R12 and C4/C7 form the RC filter circuit, causing the input positive end of U4B is a triangular wave, and the triangular wave is compared, via U4B, with a voltage value of a voltage dividing circuit formed by R10 and R11, so as to obtain the delayed first signal.

In an embodiment, in a case that the starting voltage of Uc4 is 0 V, the instantaneous voltage $U_{C4}$ (t) of the RC filter circuit during charging is as follows.

$$U_{C4}(t) = E\left(1 - e^{\frac{-t}{R12\,C_4}}\right).$$

In a case that the maximum voltage reached during charging is Uc4max, the instantaneous voltage of C4 during discharging is as follows.

$$U_{C4}(t) = U_{C4max} * e^{\frac{-t}{R12\,C_4}}.$$

The logic L2 of a switch control P outputted by U4B is constituted by the comparator circuit formed by U4B.

$$L2 = \begin{cases} 1 & \left(V\dfrac{R11}{R10+R11} < U_{C4}(t)\right) \\ 0 & \left(V\dfrac{R11}{R10+R11} > U_{C4}(t)\right) \end{cases}, \text{ where } V\dfrac{R11}{R10+R11}$$

is a voltage at a junction between R10 and R11.

Figure 8:
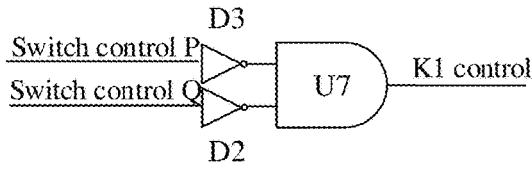
FIG. 8 is a schematic diagram of a logic circuit according to one or more embodiments of the present disclosure.
Figure 8:
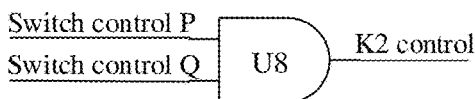

As shown in FIG. 8, in an embodiment of the present disclosure, the logic circuit 132 includes a second phase inverter D2, a third phase inverter D3, a first AND gate U7, and a second AND gate U8.

An input end of the second phase inverter D2 is connected to the hard disk state pin, and an output end of the second phase inverter D2 is connected to a first input end of the first AND gate U7; an input end of the third phase inverter D3 is connected to the output end of the time-delay circuit 131, and an output end of the third phase inverter D3 is connected to a second input end of the first AND gate U7; an output end of the first AND gate U7 is the first output end of the logic circuit 132; and a first input end of the second AND gate U8 is connected to the hard disk state pin, a second input end of the second AND gate U8 is connected to the output end of the time-delay circuit 131, and an output end of the second AND gate U8 is the second output end of the logic circuit 132.

The switch control P is the first signal, a switch control Q is a signal outputted by the time-delay circuit 131, the switch control P is connected to U7 via D3, the switch control Q is connected to U7 via D2, and a signal of the output end of U7 is configured to control K1 in the second integration circuit 111. Furthermore, the switch control P is connected to U8, the switch control Q is connected to U8, and a signal of the output end of U8 is configured to control K2 in the third integration circuit 112.

In an embodiment of the present disclosure, the first signal is a signal that is obtained through modulation by the hard disk according to the hard disk log data and the hard disk state signal corresponding to the hard disk state pin; the hard disk state pin is a state indicator lamp pin of the hard disk; the state indicator lamp pin continuously outputs the first control signal at the first level when the hard disk is in the preset state, and outputs the second control signal in a case that the hard disk is in the non-preset state; the second control signal is the rectangular wave signal; in a case that the hard disk is in the preset state, inserts the plurality of pulse signals at the second level in the first control signal at the first level, and then segments the first control signal by using the pulse signals, so as to obtain the first signal; in a case that the hard disk is in the non-preset state, codes each data bit in the hard disk log data into the level signal with the preset width corresponding to each data bit, so as to obtain the first signal; the demodulation circuit further includes an indicator lamp drive circuit, and the indicator lamp drive circuit is connected to the state indicator lamp; and the indicator lamp drive circuit is configured to receive the first signal outputted by the hard disk state pin, output the first signal to the state indicator lamp in a case that the hard disk is in the non-preset state such that the state indicator lamp flashes, and filter the pulse signal at the second level when the hard disk is in the preset state, so as to output the first control signal at the first level to the state indicator lamp.

Figure 9:
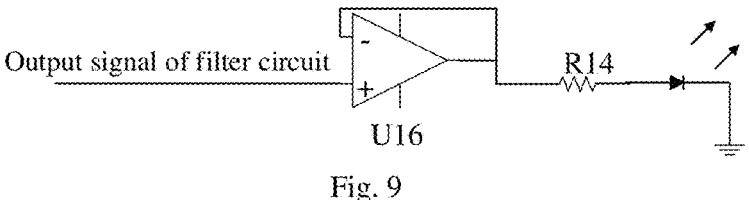
FIG. 9 is a schematic diagram of a drive circuit according to one or more embodiments of the present disclosure.

As shown in FIG. 9, in an embodiment of the present disclosure, the indicator lamp drive circuit includes a filter circuit, a fourth amplifier U16, and a fourteenth resistor R14.

The filter circuit is connected to the hard disk state pin; an output end of the filter circuit is connected to an input positive end of the fourth amplifier U16, and an input negative end of the fourth amplifier U16 is connected to its own output end and a first end of the fourteenth resistor R14, respectively; and a second end of the fourteenth resistor R14 is connected to one end of the state indicator lamp, and the other end of the state indicator lamp is grounded. In an embodiment, the used hard disk state pin is limited to the state indicator lamp pin, the state indicator lamp pin outputs a fixed level signal outputted in a case that the hard disk is in the preset state, and outputs the pulse width signal in the non-preset state such that the state indicator lamp flashes. The original functions of the indicator lamp are not affected when the state indicator lamp pin is used to output the hard disk log data.

In the embodiment, in a case that the hard disk is in the non-preset state, since the first signal obtained by coding the hard disk log data and the hard disk state signal is the pulse width signal with the preset width, the first signal is directly outputted to the indicator lamp, so as to drive the indicator lamp to flash, such that an operator learns that the hard disk is in the non-preset state. In a case that the hard disk is in the preset state, since the first signal obtained by coding the hard disk log data and the hard disk state signal includes the pulse signal at the second level opposite to the first level, and in a case that the width of the pulse signal may be limited within a minimal value, and the minimal value causes the indicator lamp that cannot be distinguished by human eyes to flash, no processing may be performed, and in a case that the width of the pulse signal is not limited within the minimal value, one filter circuit may be disposed, and the pulse signal is filtered by the filter circuit to obtain a signal at a constant first level, and the indicator lamp is driven by the signal. In an embodiment, the fourth amplifier U16 and the fourteenth resistor R14 (for current limit) may also be arranged between the indicator lamp and the filter circuit, thereby achieving the reliable driving of the indicator lamp.

In an embodiment, a drive circuit may also be disposed independently, and the detection circuit 14 controls the drive circuit to generate different drive signals according to a result of determining whether the pulse signal is present. In an embodiment, in a case that the pulse signal is present, the drive circuit is controlled to generate the signal at the first level to drive the indicator lamp. In a case that the pulse signal is not present, the drive circuit is controlled to generate a preset square wave to drive the indicator lamp to flash. In this manner, by regenerating the indicator light signal, regardless of how the hard disk log data and the hard disk state signal are coded, as long as the current state of the hard disk can be identified, the indicator lamp may be driven without affecting the drive frequency, etc.

In an embodiment of the present disclosure, the demodulation circuit further includes a buffer circuit 17. The buffer circuit 17 is connected to the analysis circuit 11 and the sampling control circuit 15, respectively. The buffer circuit 17 is configured to receive the first signal outputted by the hard disk state pin, buffer the first signal, and output the buffered first signal to the analysis circuit 11 and the sampling control circuit 15, respectively.

The buffer circuit in FIG. 2 corresponds to U13A in FIG. 3, U1A in FIG. 5, U2A in FIG. 6, and U2A in FIG. 7, respectively.

On the parameter design, in a case that the pulse width of the first signal obtained by coding the hard disk log data and the hard disk state signal through different coding manners is $t \in [t1, t2]$, and if $t2$ is the maximum pulse width when the pulse signal is not present, it is specified that:

$$\frac{t2}{RC} = 0.9.$$

It is noted that, [t1, t2] does not include a pulse width duration of the pulse signal.

In an instantaneous voltage formula during charging and a voltage formula during discharging of the RC filter circuit of the sampling control circuit 15, allowing $$t = T = \frac{t1 + t2}{2},$$

T is an intermediate parameter, and then $$E\left(1 - e^{\frac{-t}{R_9 C_3}}\right) = E\left(2 - e^{\frac{-T}{R_9 C_3}}\right) * e^{\frac{-t}{R_9 C_3}}.$$

ts (the delay time of the sampling control circuit 15) is solved according to the above formulas, in a case that ts∈ (0, t1), it reserved, and in a case that ts∈ (0,t1), ts=t1/8.

ts is put into the formula to obtain the value of $$V\frac{R8}{R7 + R8},$$

and related parameters in the circuit are set according to analysis.

$$V\frac{R8}{R7 + R8} = E\left(1 - e^{\frac{-ts}{R_9 C_3}}\right);$$

similarly, $$V\frac{R10}{R10 + R11}$$

may be obtained.

The solved ts is the delay time of the sampling control circuit 15 to the original first signal, and the delay time continues to delay td (delay time of the time-delay circuit 131 in the loop control circuit 13) on the basis of the circuit U4B. The principle of the circuit is that when the integration of the high/low level is completed, the sampling circuit 12 samples an integral value after ts is delayed, and the integration capacitor is discharged after td is delayed.

Figure 10:
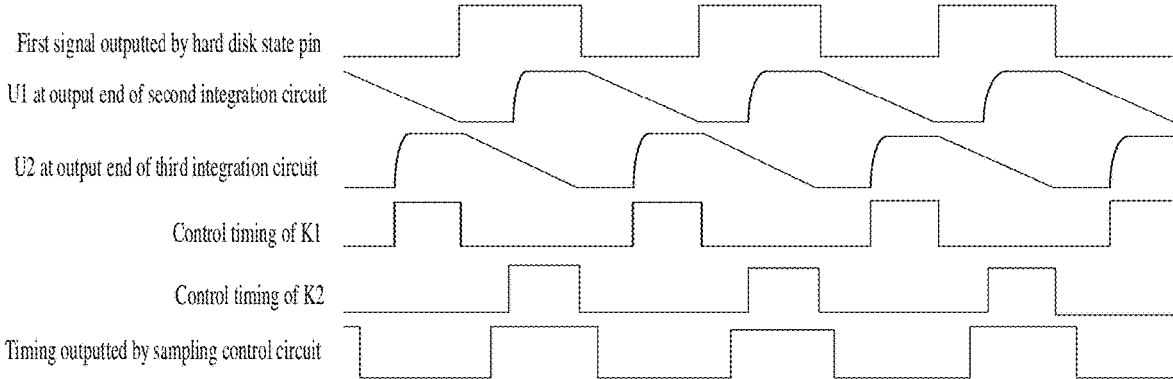
FIG. 10 is a timing diagram of each circuit according to one or more embodiments of the present disclosure.

As shown in FIG. 10, FIG. 10 is a schematic diagram of a waveform outputted by each circuit under the action of each circuit module above.

In an embodiment, the present disclosure further provides a server, including a hard disk and the above demodulation circuit. The demodulation circuit is connected to the hard disk, and is configured to receive a first signal outputted by a hard disk state pin of the hard disk, and demodulate hard disk log data according to the first signal, so as to realize the monitoring of the hard disk. The first signal includes hard disk data.

The introduction of the server refers to the above embodiments, and details are not described in the present disclosure again.

It is also to be noted that relational terms such as first and second are used merely to distinguish one entity or operation from another entity or operation herein, and do not necessarily require or imply the existence of any such actual relationship or order between these entities or operations. Furthermore, terms "comprise", "include" or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase "comprising one" does not exclude existence of other same elements in the process, the method, the article, or the device that includes the elements.

The above description of the disclosed embodiments enables those skilled in the art to implement or use the present disclosure. It is apparent that those skilled in the art will make many modifications to these embodiments, the general principles defined in the disclosure may be achieved in the other embodiments without departing from the spirit or scope of the present disclosure. Therefore, the present disclosure will not be limited to the embodiments shown herein, but to conform to the maximum extent of principles and new features that are disclosed herein.

The invention claimed is:

1. A demodulation circuit, comprising an analysis circuit, a sampling circuit, and a sampling control circuit, wherein the sampling circuit is respectively connected to the analysis circuit and the sampling control circuit;

the analysis circuit is configured to receive a first signal outputted by a hard disk state pin, and analyze a high-level signal and a low-level signal in the first signal, so as to obtain a first pulse width corresponding to the high-level signal and a second pulse width corresponding to the low-level signal, wherein the first signal includes hard disk data; and the sampling control circuit is configured to trigger, according to the first signal, the sampling circuit to sample the first pulse width and the second pulse width such that the hard disk data corresponding to the first signal is analyzed according to the sampled first pulse width and second pulse width, so as to realize the monitoring of a hard disk.

2. The demodulation circuit according to claim 1, wherein the analysis circuit comprises a charging loop and a discharging loop; the demodulation circuit further comprises a loop control circuit, and the charging loop is respectively connected to the sampling control circuit, the loop control circuit, and the discharging loop;

the charging loop is configured to perform charging according to a preset level signal in the first signal to obtain an i-th pulse width, in a case that the charging loop is turned on;

the discharging loop is configured to perform discharging according to a non-preset level signal in the first signal, in a case that the discharging loop is turned on;

the sampling control circuit is configured to trigger the sampling circuit to sample the i-th pulse width by delaying a first time after the charging loop completes charging;

the loop control circuit is configured to control the discharging loop to turn on by delaying a second time after the sampling control circuit triggers the sampling circuit to sample the i-th pulse width; and in a case that the preset level signal is the high-level signal, i is one, and in a case that the preset level signal is the low-level signal, i is two.

3. The demodulation circuit according to claim 2, wherein in a case that the preset level signal is the high-level signal and the loop control circuit detects a rising edge of the first signal, the loop control circuit controls the charging loop to turn on; in a case that the preset level signal is the high-level signal and the loop control circuit detects a falling edge of the first signal, the loop control circuit triggers the sampling circuit to sample the first pulse width; and in a case that the preset level signal is the low-level signal, the loop control circuit receives the first signal via a first phase inverter, controls the charging loop to turn on when detecting a rising edge outputted by the first phase inverter, and triggers the sampling circuit to sample the second pulse width when detecting a falling edge outputted by the first phase inverter.

4. The demodulation circuit according to claim 2, wherein the first signal is a signal that is obtained through modulation by the hard disk according to hard disk log data and a hard disk state signal corresponding to the hard disk state pin; the hard disk state pin continuously outputs a first control signal at a first level in a case that the hard disk is in a preset state, and outputs a second control signal in a case that the hard disk is in a non-preset state, wherein the second control signal is a rectangular wave signal; in a case that the hard disk is in the preset state, the hard disk inserts a plurality of pulse signals at a second level in the first control signal, and then segments the first control signal by using the pulse signals, so as to obtain the first signal; in a case that the hard disk is in the non-preset state, codes each data bit in the hard disk log data into a level signal with a preset width corresponding to each data bit, so as to obtain the first signal;

the demodulation circuit further comprises a detection circuit, wherein the detection circuit is respectively connected to the sampling control circuit and the loop control circuit; and the detection circuit is configured to detect whether the pulse signal is present in the first signal, and adjust the first time and/or the second time according to a detection result.

5. The demodulation circuit according to claim 4, wherein the manner of coding each data bit into the level signal with the preset width comprises:

coding each data bit into a pulse width signal with a corresponding duty cycle; or coding each data bit into the level signal with the preset width, and inserting an opposite level signal with a certain width between two adjacent data bits in a case that the level signals of the two adjacent data bits are opposite or the level signals of the two adjacent data bits are the same.

6. The demodulation circuit according to claim 4, wherein the detection circuit is configured to control the sampling control circuit to operate in a first mode in a case that determining that the pulse signal is present in the first signal, and control the sampling control circuit to operate in a second mode in a case that determining that the pulse signal is not present in the first signal; and after the charging loop completes charging, the sampling control circuit is configured to, trigger the sampling circuit to sample the i-th pulse width by delaying a first preset time, in a case that the sampling control circuit is in the first mode; and trigger the sampling circuit to sample the i-th pulse width by delaying a second preset time, in a case that the sampling control circuit is in the second mode, wherein the first preset time is less than the second preset time, and the first time is the first preset time or the second preset time.

7. The demodulation circuit according to claim 4, wherein the detection circuit is configured to control the loop control circuit to operate in a third mode in a case that determining that the pulse signal is present in the first signal, and control the loop control circuit to operate in a fourth mode in a case that determining that the pulse signal is not present in the first signal; and after the sampling control circuit triggers the sampling circuit to sample the i-th pulse width, the loop control circuit is configured to control the discharging loop to turn on by delaying a third preset time, in a case that the loop control circuit is in the third mode; and control the discharging loop to turn on by delaying a fourth preset time, in a case that the loop control circuit is in the fourth mode, wherein the third preset time is less than the fourth preset time, and the second time is the third preset time or the fourth preset time.

8. The demodulation circuit according to claim 4, wherein the detection circuit comprises a first integration circuit, a comparison circuit, and a trigger circuit; the trigger circuit is respectively connected to the sampling control circuit and the loop control circuit;

the first integration circuit is configured to integrate a signal at the second level in the first signal, so as to obtain a first integral value;

the comparison circuit is configured to compare the first integral value with a first preset integral value and a second preset integral value, output a first triggering signal in a case that the first integral value being greater than the first preset integral value, and output a second triggering signal in a case that the first integral value being greater than the second preset integral value, wherein the first preset integral value is less than the second preset integral value; and the trigger circuit is configured to adjust the first time and/or the second time according to the first triggering signal or the second triggering signal.

9. The demodulation circuit according to claim 4, wherein the loop control circuit comprises a time-delay circuit and a logic circuit;

an output end of the time-delay circuit is connected to a first input end of the logic circuit, a control end of the time-delay circuit is connected to the detection circuit, a second input end of the logic circuit is connected to the hard disk state pin, and an output end of the logic circuit is respectively connected to the charging loop and the discharging loop;

the time-delay circuit is configured to output the first signal by delaying the second time;

the logic circuit is configured to perform a logical operation according to a first signal outputted by the time-delay circuit and a first signal outputted by the hard disk state pin, so as to output a first turn-on signal when detecting a starting edge of a preset level signal of the first signal outputted by the hard disk state pin, and output a second turn-on signal when detecting an end edge of a preset level signal of the first signal outputted by the time-delay circuit;

the charging loop is configured to be turned on in a case that receiving the first turn-on signal to perform charging according to the preset level signal, so as to obtain the i-th pulse width; and the discharging loop is configured to be turned on in a case that receiving the second turn-on signal to perform discharging according to the non-preset level signal.

10. The demodulation circuit according to claim 9, wherein the charging loop comprises a first charging loop and a second charging loop, and the discharging loop comprises a first discharging loop and a second discharging loop;

a first output end of the logic circuit is respectively connected to a control end of the first charging loop and a control end of the first discharging loop; the hard disk state pin is respectively connected to an input end of the first charging loop, an input end of the first discharging loop, an input end of the second charging loop, and an input end of the second discharging loop; the sampling circuit is respectively connected to an output end of the first charging loop and an output end of the second charging loop; and a second output end of the logic circuit is connected to a control end of the second charging loop and a control end of the second discharging loop, respectively;

the first charging loop is configured to be turned on in a case that the logic circuit detects a rising edge of the first signal outputted by the hard disk state pin, so as to start charging, and be cut off in a case that the logic circuit detects a falling edge of the first signal outputted by the hard disk state pin, so as to stop charging, thereby obtaining a first charging voltage value corresponding to the high-level signal;

the first discharging loop is configured to be turned on in a case that the logic circuit detects a falling edge of the first signal outputted by the time-delay circuit, so as to start discharging;

the second charging loop is configured to be turned on in a case that the logic circuit detects the falling edge of the first signal outputted by the hard disk state pin, so as to start charging, and be cut off in a case that the logic circuit detects the rising edge of the first signal outputted by the hard disk state pin, so as to stop charging, so as to obtain a second charging voltage value corresponding to the low-level signal in the first signal;

the second discharging loop is configured to be turned on in a case that the logic circuit detects a rising edge of the first signal outputted by the time-delay circuit, so as to start discharging; and the sampling control circuit is configured to trigger the sampling circuit to sample the first charging voltage value by delaying the first time after the first charging loop completes charging, and trigger the sampling circuit to sample the second charging voltage value after the second charging loop completes charging.

11. The demodulation circuit according to claim 10, wherein in a case that a second integration circuit comprises the first charging loop and the first discharging loop, a circuit structure of the second integration circuit comprises a first resistor, a second resistor, a third resistor, a first capacitor, a first switch, and a first amplifier;

a first end of the first resistor is connected to the hard disk state pin, and a second end of the first resistor is respectively connected to an input negative end of the first amplifier, a first end of the first capacitor, and a first end of the third resistor; a second end of the third resistor is connected to a first end of the first switch, and a second end of the first switch is respectively connected to a second end of the first capacitor and an output end of the first amplifier; a first end of the second resistor is grounded, and a second end of the second resistor is connected to an input positive end of the first amplifier; a control end of the first switch is connected to the output end of the logic circuit; and the first switch is configured to be disconnected in a case that the logic circuit detects the rising edge of the first signal outputted by the hard disk state pin such that the first capacitor is charged via the first resistor, and be turned off in a case that the logic circuit detects the falling edge of the first signal outputted by the time-delay circuit such that the first capacitor is discharged via the third resistor.

12. The demodulation circuit according to claim 10, wherein in a case that a third integration circuit comprises the second charging loop and the second discharging loop, a circuit structure of the third integration circuit comprises a first phase inverter, a fourth resistor, a fifth resistor, a sixth resistor, a second capacitor, a second switch, and a second amplifier;

a first end of the fourth resistor is connected to the hard disk state pin via the first phase inverter, and a second end of the fourth resistor is respectively connected to an input negative end of the second amplifier, a first end of the second capacitor, and a first end of the sixth resistor; a second end of the sixth resistor is connected to a first end of the second switch, and a second end of the second switch is respectively connected to a second end of the second capacitor and an output end of the second amplifier; a first end of the fifth resistor is grounded, and a second end of the fifth resistor is connected to an input positive end of the second amplifier; a control end of the second switch is connected to the output end of the logic circuit; and the second switch is configured to be disconnected in a case that the logic circuit detects the falling edge of the first signal outputted by the hard disk state pin such that the second capacitor is charged via the fourth resistor, and be turned off in a case that the logic circuit detects the rising edge of the first signal outputted by the time-delay circuit such that the second capacitor is discharged via the sixth resistor.

13. The demodulation circuit according to claim 6, wherein the sampling control circuit comprises a seventh resistor, an eighth resistor, a ninth resistor, a third capacitor, a sixth capacitor, a third switch, and a first comparator;

a first end of the ninth resistor is connected to the hard disk state pin, and a second end of the ninth resistor is respectively connected to a first end of the third switch and an input positive end of the first comparator; a second end of the third switch is grounded via the third capacitor, and a third end of the third switch is grounded via the sixth capacitor; a first end of the seventh resistor is connected to a power supply module, and a second end of the seventh resistor is connected to a first end of the eighth resistor and an input negative end of the first comparator, respectively; a second end of the eighth resistor is grounded; an output end of the first comparator is connected to the sampling circuit; a capacitance value of the third capacitor is greater than a capacitance value of the sixth capacitor; and the first end and second end of the third switch are turned on in a case that the sampling control circuit operates in the second mode, and the first end and third end of the third switch are turned on in a case that the sampling control circuit operates in the first mode.

14. The demodulation circuit according to claim 9, wherein the time-delay circuit comprises a tenth resistor, an eleventh resistor, a twelfth resistor, a fourth capacitor, a seventh capacitor, a fourth switch, and a second comparator;

a first end of the tenth resistor is connected to a power supply module, and a second end of the tenth resistor is respectively connected to a first end of the eleventh resistor and an input negative end of the second comparator; a second end of the eleventh resistor is grounded; a first end of the twelfth resistor is connected to an output end of the sampling control circuit, and a second end of the twelfth resistor is respectively connected to a first end of the fourth switch and an input positive end of the second comparator; a second end of the fourth switch is grounded via the fourth capacitor, and a third end of the fourth switch is grounded via the seventh capacitor; an output end of the second comparator is connected to the first input end of the logic circuit; a capacitance value of the fourth capacitor is greater than a capacitance value of the seventh capacitor; and the first end and second end of the fourth switch are turned on in a case that the time-delay circuit operates in the fourth mode, and the first end and third end of the fourth switch are turned on in a case that the fourth operates in the third mode.

15. The demodulation circuit according to claim 9, wherein the logic circuit comprises a second phase inverter, a third phase inverter, a first AND gate, and a second AND gate;

an input end of the second phase inverter is connected to the hard disk state pin, and an output end of the second phase inverter is connected to a first input end of the first AND gate; an input end of the third phase inverter is connected to the output end of the time-delay circuit, and an output end of the third phase inverter is connected to a second input end of the first AND gate; an output end of the first AND gate is the first output end of the logic circuit; and a first input end of the second AND gate is connected to the hard disk state pin, a second input end of the second AND gate is connected to the output end of the time-delay circuit, and an output end of the second AND gate is the second output end of the logic circuit.

16. The demodulation circuit according to claim 8, wherein the first integration circuit comprises a third amplifier, a fifth capacitor, and a thirteenth resistor; the comparison circuit comprises a third comparator, a fourth comparator, a first reference circuit, and a second reference circuit; the trigger circuit comprises a trigger;

a first end of the thirteenth resistor is connected to the hard disk state pin via a first phase inverter, a second end of the thirteenth resistor is respectively connected to an input positive end of a third amplifier and a first end of the fifth capacitor; a second end of the fifth capacitor is grounded; an input negative end of the third amplifier is respectively connected to an output end of the third amplifier, an input negative end of the third comparator, and an input negative end of the fourth comparator; an input positive end of the third comparator is connected to the first reference circuit; an input positive end of the fourth comparator is connected to the second reference circuit; an output end of the third comparator is connected to a first input end of the trigger; an output end of the fourth comparator is connected to a second input end of the trigger; an output end of the trigger is an output end of the detection circuit; a first reference voltage outputted by the first reference circuit is less than a second reference voltage outputted by the second reference circuit.

17. The demodulation circuit according to claim 1, wherein the first signal is a signal that is obtained through modulation by the hard disk according to the hard disk log data and the hard disk state signal corresponding to the hard disk state pin; the hard disk state pin is a state indicator lamp pin of the hard disk; the state indicator lamp pin continuously outputs the first control signal at the first level in a case that the hard disk is in the preset state, and outputs the second control signal in a case that the hard disk is in the non-preset state such that a state indicator lamp flashes; the second control signal is the rectangular wave signal;

the hard disk in the preset state, inserts the plurality of pulse signals at the second level in the first control signal at the first level, and segments the first control signal by using the pulse signals, so as to obtain the first signal; the hard disk in the non-preset state, codes each data bit in the hard disk log data into the level signal with the preset width corresponding to each data bit, so as to obtain the first signal; and the demodulation circuit further comprises:

an indicator lamp drive circuit, connected to the state indicator lamp, wherein the indicator lamp drive circuit is configured to receive the first signal outputted by the hard disk state pin, output the first signal to the state indicator lamp in a case that the hard disk is in the non-preset state such that the state indicator lamp flashes, and filter the pulse signal at the second level in a case that the hard disk is in the preset state, so as to output the first control signal at the first level to the state indicator lamp.

18. The demodulation circuit according to claim 17, wherein the indicator lamp drive circuit comprises a filter circuit, a fourth amplifier, and a fourteenth resistor;

the filter circuit is connected to the hard disk state pin; an output end of the filter circuit is connected to an input positive end of the fourth amplifier, and an input negative end of the fourth amplifier is connected to its own output end and a first end of the fourteenth resistor, respectively; and a second end of the fourteenth resistor is connected to one end of the state indicator lamp, and the other end of the state indicator lamp is grounded.

19. The demodulation circuit according to claim 1, further comprising a buffer circuit, wherein the buffer circuit is respectively connected to the analysis circuit and the sampling control circuit;

the buffer circuit is configured to receive the first signal outputted by the hard disk state pin, buffer the first signal, and output the buffered first signal to the analysis circuit and the sampling control circuit, respectively.

20. A server, comprising a hard disk, and the demodulation circuit, wherein the demodulation circuit is connected to the hard disk; and the demodulation circuit comprises a sampling circuit, and a sampling control circuit, wherein the sampling circuit is respectively connected to the analysis circuit and the sampling control circuit;

the analysis circuit is configured to receive a first signal outputted by a hard disk state pin, and analyze a high-level signal and a low-level signal in the first signal, so as to obtain a first pulse width corresponding to the high-level signal and a second pulse width corresponding to the low-level signal, wherein the first signal includes hard disk data;

the sampling control circuit is configured to trigger, according to the first signal, the sampling circuit to sample the first pulse width and the second pulse width such that the hard disk data corresponding to the first signal is analyzed according to the sampled first pulse width and second pulse width, so as to realize the monitoring of a hard disk; and the demodulation circuit is configured to receive a first signal outputted by a hard disk state pin of the hard disk, and demodulate hard disk log data according to the first signal, so as to realize the monitoring of the hard disk, wherein the first signal comprises hard disk data.

* * * * *